United States Patent [19]

Teass et al.

[11] Patent Number: 4,459,671
[45] Date of Patent: Jul. 10, 1984

[54] FUEL MANAGEMENT CONTROL SYSTEM

[76] Inventors: Garnette S. Teass; Horace A. Teass, Jr., both of 25 Mead Rd., Armonk, N.Y. 10705

[21] Appl. No.: 316,744

[22] Filed: Oct. 30, 1981

[51] Int. Cl.³ .......................... G01L 3/26; G06F 15/20
[52] U.S. Cl. .................................. 364/442; 364/464; 73/114
[58] Field of Search ............... 364/442, 464, 710, 715; 73/113, 114

[56] References Cited

U.S. PATENT DOCUMENTS

| | | | |
|---|---|---|---|
| 3,972,224 | 8/1976 | Ingram | 364/442 |
| 4,286,324 | 8/1981 | Ingram | 364/442 |
| 4,312,041 | 1/1982 | DeJonge | 364/442 |
| 4,325,123 | 4/1982 | Graham et al. | 364/442 |

*Primary Examiner*—Gary Chin
*Attorney, Agent, or Firm*—Peck & Peck

[57] ABSTRACT

The speed of a vehicle, and particularly a ship, is controlled to minimize the sum of fixed and variable operating costs. The variable costs are incurred substantially only due to fuel usage. The rotational speed and torque parameters of the ship propeller shaft are measured and utilized to derive an expression for shaft horsepower in terms of these parameters. The variable cost function is derived from the horsepower function, fuel factor, unit volume fuel cost and voyage distance for various ship speeds. The fixed cost function is determined on the basis of voyage time for the various speeds, loading time and total annual costs for maintaining the ship per unit of time. The ship throttle is controlled to operate at the speed at which the total fixed and variable costs is minimized. Throttle control may be automatic, by means of an ERROR signal which is nulled when the ship achieves the speed corresponding to the minimum total costs, or manual, by means of an operator selecting from a CRT-displayed table the ship speed which minimizes the total costs. For revenue-producing ships, voyage profit is computed for different speeds by subtracting the total costs at those speeds from gross revenue.

9 Claims, 1 Drawing Figure

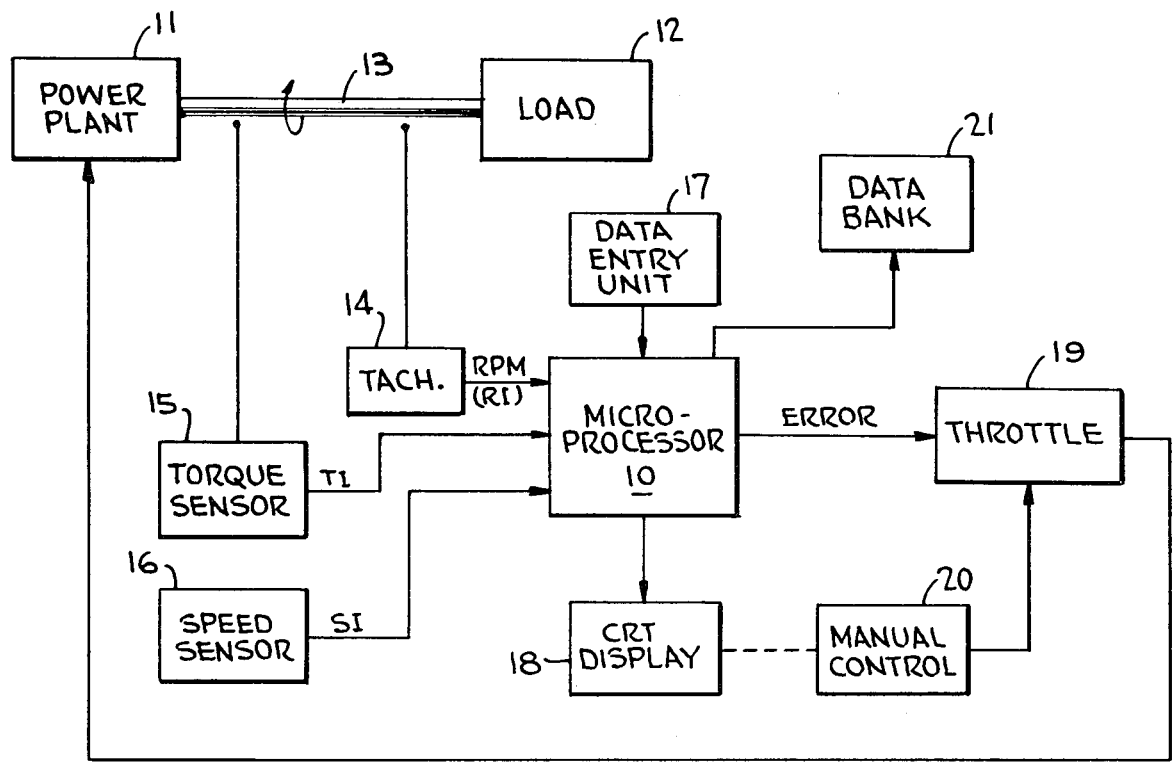

FUEL MANAGEMENT CONTROL SYSTEM

TECHNICAL FIELD

The present invention relates to a method and apparatus for controlling the speed of a vehicle to minimize operational cost. In a specific embodiment, the invention relates to controlling the speed of a revenue producing propeller-driven ship so as to operate the ship at a speed which maximizes profit.

BACKGROUND OF THE INVENTION

Many revenue-producing ship owners and operates overlook the fact that more money may be made by operating the ship at low speeds. At first thought, this may seem to be incongruous; that is, the faster the cargo or passengers are carried to the destination port, the higher would seem to be the profit of the voyage. However, a careful analysis of all operating costs surprisingly illustrates that the faster voyage is not necessarily the more profitable voyage. The reason for this is that the relationship between ship speed and energy consumed to produce speed is not linear. For example, to move a ship through water at 15 knots, as opposed to 10 knots, typically requires 350 percent more fuel to obtain a 50 percent increase in speed. On the other hand, while speed reductions may save fuel costs, it is also true that fixed costs associated with the vessel tend to increase as voyage time lengthens. To illustrate this point, reference is made to Table I which illustrates an example of profit per voyage for a ship based on averaged published data for numerous cargo carrying vessels. The specific numbers in Table I may bear little relationship to an individual ship or the operations of a specific company; nevertheless, the example illustrates the principles involved in the present invention.

For purposes of this analysis, fuel costs are assumed to be the only variable cost, all other expenses being considered fixed costs. It is also assumed in Table I that there is a constant demand for a vessel's services and that it will be in service the maximum amount of time possible. For example, ten hours of "in port" time per thousand miles of travel is assumed. Fixed costs, that is all costs other than fuel costs, are allocated on the basis of the number of hours in a year (i.e., 8760).

Table II is provided below to illustrate the correlation between total costs and profit per voyage for a revenue-bearing vessel.

TABLE II

1000 MILE VOYAGE - PROFIT PER VOYAGE

| SPEED (KNOTS) | TOTAL COSTS | REVENUE PER VOYAGE | PROFIT PER VOYAGE | PROFIT AS PERCENTAGE OF SALES |
|---|---|---|---|---|
| 10 | $35901 | $38600 | $2699 | 6.9% |
| 11 | 34852 | 38600 | 3748 | 9.7% |
| 12 | 33421 | 38600 | 5179 | 13.4% |
| 13 | 33177 | 38600 | 5423 | 14.0% |
| 14 | 34348 | 38600 | 4252 | 11.0% |
| 15 | 36222 | 38600 | 2378 | 6.1% |
| 16 | 38056 | 38600 | 543 | 1.4% |
| 17 | 40883 | 38600 | (2283) | 0 |
| 18 | 44923 | 38600 | (6990) | 0 |
| 19 | 50503 | 38600 | (11903) | 0 |
| 20 | 55962 | 38600 | (17362) | 0 |
| 21 | 63256 | 38600 | (24656) | 0 |

Table II utilizes the total costs from Table I for each vessel's speed and subtracts these from an assumed value for the voyage. As is illustrated from the two right hand columns in Table II, profit is maximized at the same speed, 13 knots, at which the total costs are minimized.

As is clear from Table I, the primary ship parameter

TABLE I

1000 MILE VOYAGE - COSTS PER VOYAGE

| SPEED (KNOTS) | SHP REQUIRED TO MAINTAIN SPEED (HORSE POWER) | TIME REQUIRED FOR VOYAGE (HOURS) | FUEL COSTS | FIXED COSTS | TOTAL COSTS |
|---|---|---|---|---|---|
| 10 | 1368 | 100 | $2901 | $33000 | $35901 |
| 11 | 2359 | 91 | 4552 | 30300 | 34852 |
| 12 | 3137 | 83 | 5521 | 27900 | 33421 |
| 13 | 4334 | 77 | 7077 | 26100 | 33177 |
| 14 | 6205 | 71 | 10048 | 24300 | 34348 |
| 15 | 9157 | 67 | 13122 | 23100 | 36222 |
| 16 | 13804 | 62 | 16456 | 21600 | 38056 |
| 17 | 16654 | 58 | 20483 | 20400 | 40883 |
| 18 | 21798 | 55 | 25423 | 19500 | 44923 |
| 19 | 28119 | 53 | 31603 | 18900 | 50503 |
| 20 | 35803 | 50 | 37962 | 18000 | 55962 |
| 21 | 45051 | 48 | 45856 | 17400 | 63256 |

As seen from Table I, the fuel costs increase dramatically, at an exponential rate, as the speed is increased. The fuel costs are directly related to the propeller shaft horsepower (SHP) required to maintain a particular speed. On the other hand, because the time required for the voyage decreases with increasing speed, the fixed costs decrease with increasing speed. The total cost of the voyage is essentially the sum of the fuel costs and the fixed costs and is illustrated in the far right column in Table I. For this particular example, it is seen that the total costs are minimized at approximately 13 knots. This information is extremely valuable for any vessel, whether revenue-bearing or not, to minimize costs of operation.

to be considered in determining variable cost of ship operation at different speeds is the shaft horsepower (SHP). In U.S. Pat. No. 3,972,224 (Ingram) there is disclosed a system for continuously providing a direct readout of shaft horsepower and fuel rate efficiency. The shaft horsepower is computed on the basis of monitored values of the shaft torque and rotational velocity. The indications of instantaneous shaft horsepower and instantaneous fuel usage are provided for use by the vessel operator in any manner seemed fit. However, as will be noted from the discussion set forth above relating to Tables I and II, a mere indication of shaft horsepower or fuel rate efficiency (i.e. variable cost of vessel operation) does not provide the vessel operators with sufficient information to determine the proper vessel speed for minimizing total operating costs and/or maximizing profit for a voyage.

SUMMARY OF THE INVENTION

It is therefore an object of the present invention to provide a method and apparatus for automatically determining the speed of a vessel at which operating costs are minimized and profit is maximized.

It is a further object of the present invention to provide a method and apparatus for automatically controlling a throttle for a vessel whereby the vessel's speed is automatically adjusted to that at which operating costs are minimized and profit is maximized.

In accordance with the present invention, a micro-processor is employed and receives information for computing both variable cost and fixed cost for operating the vessel. In order to permit the necessary computations, various accounting and engineering data is entered into the micro-processor from a keyboard prior to the voyage. This information typically includes: the total expenses less fuel costs attributable to the vessel for a given period of time; the revenue to be received for the voyage; the vessel fuel factor; the cost of fuel per unit volume; the distance of the voyage; anticipated loading time; etc. During the voyage both shaft angular velocity and shaft torque are continuously monitored and fed to the computer so that the shaft horsepower can be computed. From these parameters, the total cost of operating the vessel at different speeds is computed and provided as a readout for the vessel operator as a list, much in the form of Table II. The vessel operator has the option of permitting the throttle to be automatically controlled to achieve optimum profit (i.e. minimized total costs) or to manually control the throttle to achieve a desired speed based on the information listed in the readout.

BRIEF DESCRIPTION OF THE DRAWINGS

The above and still further objects, features and advantages of the present invention will become apparent upon consideration of the following details of the description of a specific embodiment thereof, especially when taken in conjunction with the accompanying drawing wherein the single FIGURE is a block diagram of the invention.

DESCRIPTION OF THE PREFERRED EMBODIMENTS

Referring to the drawing in greater detail, a micro-processor 10 serves the necessary computational and control function for the system. The micro-processor is preferably a general purpose digital computer with at least fifty thousand bits of memory and a magnetic file storage of at least one hundred thousand bits. A commercially available micro-processor which has been used successfully for this purpose is the APPLE II model which is now in wide use in both industry and in the home. A listing for a program usable with the APPLE II to perform the functions required of the present invention is present in Appendix A. Micro-processor 10 is employed to control the operation of power plant 11 as it drives a load 12. Power plant 11 is typically the power plant for a vehicle, such as a ship, which drives an engine shaft, such as the ship's propeller shaft 13, to actuate load 12. Load 12 is typically the propellers of the ship. Alternatively, if the invention is employed for use with land vehicles, load 12 corresponds to the wheels of the vehicle.

A tachometer 14 is coupled to the propeller shaft 13 to provide a direct current output signal RPM (RI) representative of the propeller shaft angular rotational speed. Tachometer 14 may take the form of the tachometer illustrated and described in U.S. Pat. No. 3,972,224. The rotational speed signal RPM (RI) is applied directly to micro-processor 10.

A torque sensor 15 is coupled to propeller shaft 13 to provide a direct current output signal TI which is also applied to micro-processor 10. Torque sensor 15 senses the torque delivered by propeller shaft 13 in response to delivery of power to shaft 13 from power plant 11. The torque sensor may be the torque sensor husk assembly, model 61001, manufactured by McNAB, Inc. of Mount Vernon, N.Y. Alternatively, torque sensor 15 may take the form of the torque sensor illustrated and described in U.S. Pat. No. 3,972,224.

A speed sensor 16, which can be an optional piece of equipment if the speed is to be computed within the micro-processor, converts the speed of the vessel to a direct current signal SI which is applied directly to micro-processor 10. Speed sensor 16 may take the form of model No. UL-200-72-M manufactured by Cambridge Instrument Company of Maryland.

Tachometer 14, torque sensor 15 and speed sensor 16 continuously apply their signals to the micro-processor.

A data entry unit 17, typically a keyboard entry unit, is provided to supply certain data to the unit before the voyage or, in some cases, during the voyage. Among other things, the data entry unit 17 is employed to enter various accounting and engineering data employed by the micro-processor to determine the variable and fixed costs of the voyage at various vessel speeds.

A CRT display 18 is provided in conjunction with micro-processor 10 to display data, computations, etc., as needed. In addition, a data bank 21 is provided to receive data from the computer and provide data back to the computer under the control of the computer 10. The computer provides an ERROR signal to the vessel's throttle 19 for purposes of controlling the throttle position and thereby the amount of energy delivered by the power plant 11. Alternatively, throttle 19 can be controlled by a manual control unit 20 which is actuable by the operator upon noting the readout at CRT display unit 18.

Prior to the voyage, certain data listed in Table III are entered into the micro-processor 10 via keyboard 17. This data is as follows:

TABLE III

| Data Abbreviation | Data Description |
|---|---|
| D | Total expenses (less fuel) attributable to vessel for a year |
| E | Gross revenue for voyage |
| F | Fuel factor; volume of fuel required to produce one shaft horsepower hour |
| I | Cost of unit volume of fuel |
| J | Voyage distance (miles) |
| L | Speed factor; advance of vehicle 60 divided by feet in mile |
| M | Speed slippage factor; slippage occurring between propeller and environment |
| U | Anticipated vessel loading time in hours |
| SD | Speed constant (loop speed) |
| RD | RPM constant |

The detail as to how the data of Table III are derived is not important for purposes of the present invention. Typically, the data is derived by reviewing historical records from the accounting and/or engineering departments of the company, in the case of a revenue-bearing vessel.

As the vehicle begins the voyage, the micro-processor samples the RPM (RI), torque (TI) and speed (SI) signals at specified periodic intervals and stores the samples in data bank 19. This data collection process, which may be referred to as "the learning phase" of the voyage, continues until the steady state full speed of the vehicle has been achieved. Typically, there may be between thirty and three thousand samples made.

Upon arriving at steady state full speed, which condition is either indicated manually to the computer or sensed by the computer in response to successive constant samples of signal SI, the computer 10 retrieves the various data samples from data bank 21. The computer utilizes these samples to compute the values for QY and QX for the voyage in accordance with equations (1) and (2), respectively:

$$QY = \frac{n\sum_1^n (LOG_e x_i LOG_e y_i) - \left(\sum_1^n LOG_e x_i\right)\left(\sum_1^n LOG_e y_i\right)}{n\sum_1^n (LOG_e x_i)^2 - \left(\sum_1^n LOG_e x_i\right)^2} \quad (1)$$

$$QX = \exp\left[\frac{1}{n}\left(\sum_1^n LOG_e y_i - \left(\sum_1^n LOG_e x_i\right) b\right)\right] \quad (2)$$

In the equations for QY and QX, the value $x_i$ corresponds to the speed (SI), whereby $y_i$ corresponds to the value of the shaft horsepower (SHPI) for corresponding samples, it being noted that (RI×TI)/constant is equal to SHPI. It should also be noted that n corresponds to the number of samples of the signal SI, and b is equal to QY.

In the conclusion phase, the values of QX and QY are employed in determining the calculated shaft horsepower (SHPD) in accordance with equation (3), namely:

$$SHPD = QX \times K^{QY} \quad (3)$$

In equation (3), the parameter K represents the speed constant (SD) and is determined in accordance with equation (4) as follows:

$$K = SD \quad (4)$$

In equation (4) and elsewhere wherein, the constant SD is a speed parameter which is incrementally stepped through a probable or likely range of ship speeds, automatically in a "for"-"to" type loop by micro-processor 10, to determine the value of K (and hence the value of SHP) at different substituted ship speeds.

Upon determination of the calculated shaft horsepower (SHPD), the variable cost (VC) is determined in accordance with equation (5), as follows:

$$VC = SHPD \times F \times I \times J/SD \quad (5)$$

where the parameters F, I and J are defined in Table III.

The fixed cost (FC) may also be determined in accordance with equation (6):

$$FC = [(J/SD) + U] \times D/8760 \quad (6)$$

From the fixed cost and variable cost computation at each speed SD, the profit of the voyage (PS) may be determined from equation (7):

$$PS = E - VC - FC \quad (7)$$

where E is a parameter as defined in Table III. Likewise, the percentage profit (PF) may be determined as in accordance with equation (8):

$$\%PF = PS/(100 \times E) \quad (8)$$

The throttle 19 is controlled by the ERROR signal which is derived in response to the computation in equation (7) so that the vessel operates at the speed at which profit is maximized. The sensed or computed vehicle speed provides a closed loop which causes the ERROR signal to know when the speed corresponding to maximum profit is attained by the vessel. In the preferred embodiment, the speed constant (SD) is exercised across a range of probable or likely speeds in equations (3), (5), and (6) and corresponding values of PS are found via equation (7). Assume the PS(a) is the value of profit for the speed being calculated, PS(a+1) is the profit value of the next higher speed in the selected probable range, and PS(a−1) is the profit value at the next low speed in the range. When PS(a) is greater than both PS(a−1) and PS(a+1), then the speed corresponding to PS(a) is the optimum speed for maximizing profit. If the optimum speed exceeds the current measured value of SI, the error signal controls throttle 19 to slow down the vessel. Likewise, if the value of SI is below calculated optimum speed, then the error signal actuates throttle 19 to increase the vessel speed.

In addition, the micro-processor causes a chart, such as that provided in Table II, to be displayed at the CRT display 18 whereby the results of the various computations for total costs and profit may be provided for the operator. The operator can then override the closed control loop, if desired, to operate at any speed with the knowledge that variation from the optimum profit speed will result in less profit for the voyage.

It should be noted that the ERROR signal may be derived from a minimization of the sum VC+FC rather than the profit equation (7). The end result is substantially the same and this approach is more appropriate to non-revenue-bearing vessels.

If speed sensor 16 is deleted, the speed indicated SI can be derived in accordance with equation (9) as follows:

$$SI = SD = RI \times L \times M \quad (9)$$

wherein L and M are parameters as defined in Table III and RI corresponds to the measured value in the signal RPM (RI). In any case, this parameter may be continuously displayed at the CRT display 18 along with the indicated horsepower SHPI of the shaft which is determined in accordance with equation (10) as follows:

$$SHPI = RI \times TI/2.626 \quad (10)$$

For purposes of reducing the shaft horsepower indication on the CRT display, the function is scaled down to read in units of ft-tons.

All of the components illustrated in the drawings are carried aboard ship and take up relatively little space. The invention permits continuous indication of instantaneous horsepower delivered by the propeller shaft as well as ship speed while constantly computing and displaying the value of the ship speed which optimizes profits and costs.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A method for minimizing the costs during a trip of operating a vehicle having a drive shaft comprising the steps of:
    measuring the angular velocity of the drive shaft of the vehicle at plural vehicle speeds;
    measuring the torque delivered by the drive shaft of the vehicle at plural vehicle speeds;
    deriving a function for the power delivered by the drive shaft in terms of the shaft torque and angular velocity measurement;
    deriving an expression from said function for power delivered by the drive shaft in terms of speed;
    deriving the variable costs of the vehicle trip at a predetermined plurality of vehicle speeds as a function of the derived expression for delivered power;
    deriving the fixed costs of the vehicle voyage at said predetermined plurality of vehicle speeds;
    summing the derived fixed costs and variable costs to determine the total cost of the trip at said predetermined plurality of vehicle speeds; and
    controlling a vehicle throttle to adjust the vehicle speed to the speed at which the determined total cost is minimum.

2. The method according to claim 1, wherein said trip is a revenue-producing trip, said method further including the step of:
    determining the trip profit at each of said predetermined plurality of vehicle speeds by subtracting the total trip cost at each speed from the gross revenue produced by the trip.

3. The method according to claim 2, further including the step of visibly displaying a chart showing each of said predetermined plurality of vehicle speeds and its corresponding determined trip profit.

4. The method according to claim 1, further including the step of visibly displaying a chart showing each of said predetermined plurality of vehicle speeds and its corresponding determined total trip cost.

5. The method according to claims 1 or 2, wherein the vehicle is a ship, the trip is a voyage and the step of deriving variable costs for the voyage is performed in accordance with the equation:
$VC = SHPD \times F \times I \times J/SD$, wherein VC is the variable cost of the voyage at different speeds, SHPD is the derived expression for power delivered by the propeller shaft, F is the volume of fuel required to cause the propeller shaft to deliver one unit of work, I is the cost of fuel per unit volume, J is the total distance of the voyage and SD represents individual speeds of said predetermined plurality of speeds.

6. The method according to claim 5, wherein: $SHPD = QX \times K^{QY}$, wherein $$QX = \left[ \exp \frac{1}{n} \left( \sum_{1}^{n} LOG_e y_i - \left( \sum_{1}^{n} LOG_e x_i \right) b \right) \right],$$

$$QY = \frac{n \sum_{1}^{n} (LOG_e x_i LOG_e y_i) - \left( \sum_{1}^{n} LOG_e x_i \right) \left( \sum_{1}^{n} LOG_e y_i \right)}{n \sum_{1}^{n} (LOG_e x_i)^2 - \left( \sum_{1}^{n} LOG_e x_i \right)^2}$$

$x_i$ corresponds to speed,
$y_i$ corresponds to shaft horsepower,
$K = SD$,
$b = QY$, and
$n$ corresponds to said predetermined plurality of vehicle speeds.

7. The method according to claims 1 or 2, wherein the vehicle is a ship, the trip is a voyage and the step of deriving the fixed costs of the ship voyage is performed in accordance with the equation:

$FC = [(J/SD) + U] \times D/8760$, wherein FC is the fixed costs less fuel cost of the voyage at different speed, J is the total distance of the voyage, SD represents individual speeds of said predetermined plurality of speeds, U is the loading time for the ship in port, and D is the total fixed cost less fuel cost for a year to maintain the ship.

8. The method according to claims 1 or 2, further comprising the step of displaying the actual measured speed of the vehicle.

9. The method according to claims 1 or 2, wherein the vehicle is a ship, the drive shaft is a propeller shaft, and further comprising the step of displaying the speed of the ship in accordance with the following equation:

$SI = RI \times L \times M$, wherein SI is the computed ship speed, RI is the actual angular velocity of the propeller shaft at the instant of computation, L is the distance travelled by the ship in response to 60 propeller shaft revolutions and M is a constant representing slippage of the vehicle propeller in water.

* * * * *